United States Patent [19]
Holzwarth

[11] 4,289,347
[45] Sep. 15, 1981

[54] VEHICLE FOLDING TOP

[75] Inventor: Robert W. Holzwarth, Portage, Mich.

[73] Assignee: The Model A and Model T Car Reproduction Corporation, Detroit, Mich.

[21] Appl. No.: 71,926

[22] Filed: Sep. 4, 1979

[51] Int. Cl.³ ............................................. B60J 7/12
[52] U.S. Cl. ................................................... 296/107
[58] Field of Search ................................. 296/107, 108

[56] References Cited

U.S. PATENT DOCUMENTS

| | | | |
|---|---|---|---|
| 1,146,162 | 7/1915 | Holden | 296/107 |
| 1,219,735 | 3/1917 | Harvey | 296/107 |
| 1,759,250 | 5/1930 | Wright | 296/107 |
| 1,809,505 | 6/1931 | Campbell | 296/107 |
| 2,076,243 | 4/1937 | Marshall | 296/107 |

*Primary Examiner*—Robert R. Song
*Attorney, Agent, or Firm*—Settle and Walker

[57] ABSTRACT

A frame for vehicle folding tops is disclosed. The folding top of the present invention is configured to be moved from a deployed position covering the vehicle passenger compartment to a folded position in one single continuous motion. No sliding linkages or over center linkages are employed. The frame comprises only three bows to support the folding top, and when the frame has been moved to a folded position and the bows abut each other at a rear deck of the vehicle. A rear bow is pivotally attached at a lower end to a rear portion of the vehicle passenger compartment in a pivoting manner. Front and center bows are pivotally supported at their open ends by the rear bow. The front bow is folded upward at a point forward of the center bow, and a scissor linkage interconnecting the front bow and the center bow assures that in the folded position the bows lie parallel and abut each other at a rear deck of the vehicle.

3 Claims, 5 Drawing Figures

VEHICLE FOLDING TOP

BACKGROUND OF THE INVENTION

I. Field of the Invention

The present invention relates to the field of vehicle roofs or tops. More particularly the present invention relates to the field of folding vehicle tops. Even more particularly the present invention relates to the field of folding roofs or tops for vehicles which are movable from a deployed position to a folded position wherein the bows of the frame abut each other in a parallel manner at a rear deck of the vehicle.

II. Prior Art Statement

Folding vehicle tops that fold to a compact size to be stored at a rear portion of the vehicle have long been known. Generally, the frames for the known folding tops comprise many pieces including bows and pivots. The known vehicle folding tops that come closest to the teachings of the present invention are as follows:

U.S. Pat. No. 1,146,162 discloses a folding top for vehicles comprising five bows. At least two sliding linkages are required to fold the top of the vehicle.

U.S. Pat. No. 1,521,198 discloses a top for vehicles that folds and comprises four bows to support the top. Two folding linkages and a sliding pivot are required for the operation of this folding top.

U.S. Pat. No. 1,179,567 discloses a folding vehicle top requiring four bows to support the top and a folding link and a sliding link for satisfactory operation of the top.

U.S. Pat. No. 1,219,735 discloses a cover for collapsible canopy tops for vehicles. The frame of this collapsible top requires three bows as in the present invention. However the front bow in this patent is pivoted from the center bow extending rearward and downward.

U.S. Pat. No. 1,539,209 discloses a folding vehicle top requiring four bows to support the top. The frame of this patent requires two sliding pivots for its operation.

None of the above listed United States Patents disclose the frame of the present invention which comprises a rearward and upward extending bow pivoted at its lower ends to a rear portion of the vehicle passenger compartment. The center bow and forward bow are pivotally supported by the rear bow. The legs of the front bow are foldable proximate a center thereof. A parallel abutting position for the bows in a folded position is assured by a scissor linkage interconnecting the front bow and the center bow proximate the front bow's hinged point.

The above listed U.S. patents constitute the closest prior art pertaining to the present invention which is known to the Applicant and his attorney.

SUMMARY OF THE INVENTION

It is an object of the present invention to provide a frame for vehicle folding tops. It is also an object of the present invention to provide a frame for vehicle folding tops having a minimum number of parts. It is a further object of the present invention to provide a frame for vehicle folding tops that is movable from a deployed position to a folded position in a single motion with the bows of the top abutting each other in a parallel manner resting on a rear deck of the vehicle.

It is also an object of the present invention to provide a frame for a vehicle folding top which employs only three bows to support the top in a deployed position and uses no sliding linkages in its operation.

It is a further object of the present invention to provide a scissor linkage assuring that the bows in their folded position abut each other in a parallel manner.

The frame for a vehicle folding top of the present invention comprises a rear bow hingedly supported at its lower ends to a rear portion of the vehicle passenger compartment. A center bow is hingedly supported by the rear bow and extends upward and forward therefrom. A front bow has horizontal legs which extend rearward and are hingedly supported by the rear bow near a top portion thereof. The horizontal leg of the front bow is hinged proximate a center thereof to allow the horizontal legs of the front bow to be hinged upward and rearward. A scissor linkage is interconnected to the hinged legs of the front bow and the center bow so that when the front bow is hinged upward the bows come together in a parallel abutting manner to rest on a rear deck of the vehicle.

In a deployed position the front bow is secured to the windshield posts of the vehicle by a rod projecting upward from each windshield post which snugly receives a vertical aperture formed in a corner bracket secured to the corners of the front bow. A threaded aperture intersecting the vertical aperture threadingly receives a wing screw which is tightened to secure the corner brackets to the windshield posts.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein.

DESCRIPTION OF THE PREFERRED EMBODIMENT

Figure 1:
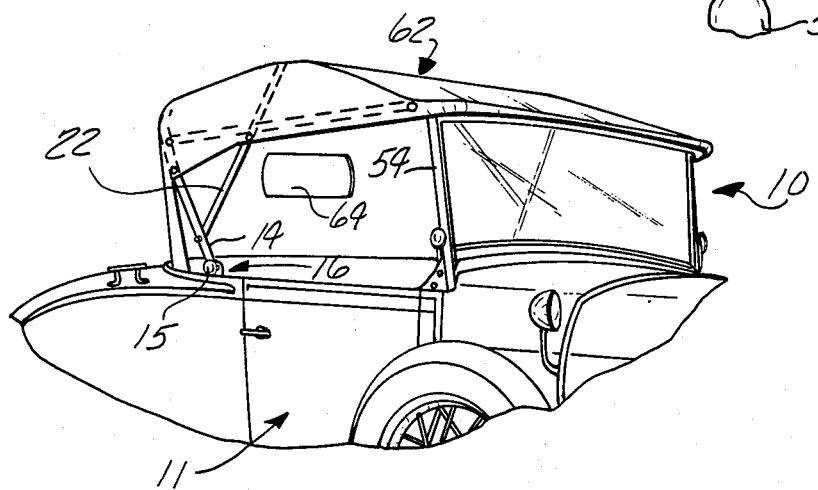
FIG. 1 illustrates a broken perspective view of a vehicle with a top of the present invention.
Figure 2:
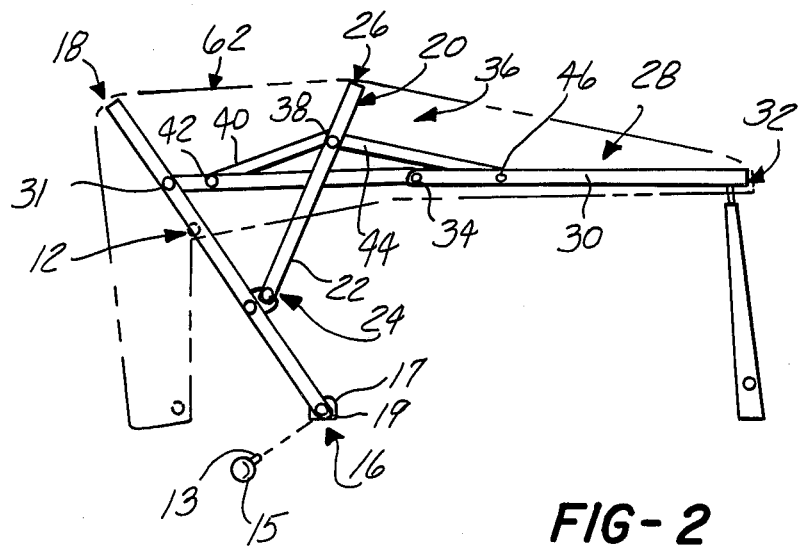
FIG. 2 illustrates a side view of the vehicle top frame of the present invention.
Figure 3:
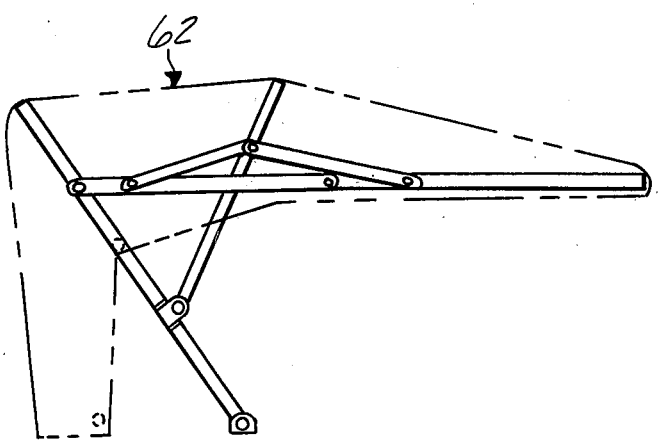
FIG. 3 illustrates a view of the scissor linkage of the present invention as seen from inside the vehicle.

Referring now to the drawings and in particular to FIG. 1 wherein there is illustrated at 10 a perspective view of a preferred embodiment of the frame and top of the present invention mounted on a vehicle 11. The frame 10 (FIG. 2) comprises a rear bow 12 including a pair of upward and rearward extending legs 14 which are hinged to a rear portion of the vehicle passenger compartment by hinges 16. The hinge 16 includes a bracket 17 affixed to the vehicle and an aperture 19 formed in a lower end of the bow 12. A knob 15 with a threaded shank 13 threadingly engages a threaded aperture (not shown) formed in the bracket 17 to hingingly and releasably secure the bow 12 to the vehicle. The upward and rearward extending legs 14 curve inward in an arcuate manner at an upper end thereof to form a first transverse section 18 extending between legs and forming the rear bow 12 into an integral piece. A center bow 20 includes, in a deployed position, a pair of upward and forward extending legs 22 supported in a hinged manner by the rear bow 14 at a pivot 24 spaced upward from the hinge 16. The legs 22 curve arcuately inward at an upper end to form a second transverse section 26 which extends between legs to join the center bow into an integral piece. A front bow 28 comprises a pair of horizontal legs 30 hinged at a rear end to an upper portion of the rearward extending legs by pivots 31. The horizontal legs extend forward in a deployed position to a point proximate a windshield edge, then the horizontal legs curve inward in an arcuate manner to form a forward transverse section 32 which joins the horizontal legs into an integral structure. The horizontal legs 28 are broken into two proximate equal lengths hinged together by a pivot 34, and are foldable in an upward and rearward direction at the pivot point 34.

A pair of scissor linkages 36 include a pair of opposed linkage pivots 38 that are affixed to each of the upward and forward extending legs 22 above the horizontal legs 28. A pair of opposed short rearward extending scissors legs 40 are pivoted at a forward end to the linkage pivot 38 and a rear end to the horizontal leg by a pivot 42. A pair of opposed longer forward extending scissor legs 44 are pivoted at a rear end to each linkage pivot 38 and at a forward end to the horizontal legs forward of the horizontal leg pivot 34 by a forward pivot 46.

Figure 4:
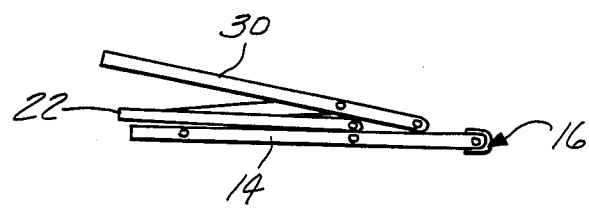
FIG. 4 illustrates the frame of FIG. 1 in the folded position.

When the front bow is hinged upward and rearward, the front bow, the center bow, and the rear bow all pivot in unison abutting together in a parallel manner at a rear deck of the vehicle, as illustrated in FIG. 4.

Figure 5:
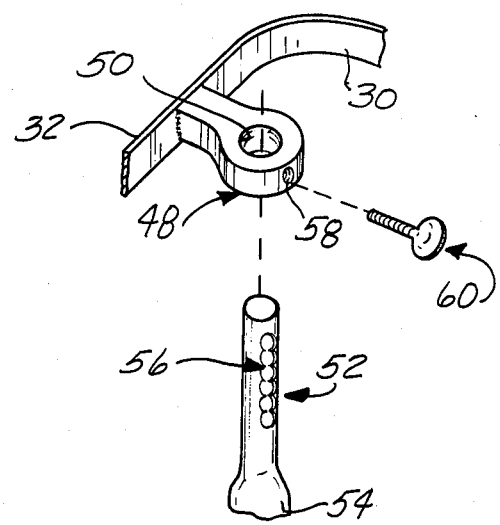
FIG. 5 illustrates a perspective view of the front bow and corner bracket for securing the front bow to the vehicle windshield posts.

In the delayed position the front bow 28 is secured to the windshield posts by a pair of corner brackets 48 (FIG. 5) affixed to an inside surface of the outer ends of the forward transverse section 32 by welding or other suitable means. A vertical aperture 50 formed in the brackets 48 snugly receives a rod 52 formed on an upper end of the windshield support posts 54. A plurality of overlapping shallow apertures 56 are formed along a rearward facing side of the rods to form an interlocking surface to aid in securing the corner brackets to the rods in a manner which will be described subsequently. A longitudinal threaded aperture 58 formed in the corner bracket 48 intersects the vertical aperture 50 allinged with the plurality of overlapping shallow apertures 56. A wing screw 60 threadingly engages the threaded aperture abutting the plurality of overlapping shallow apertures 56 to secure the corner brackets 48 to the windshield posts 54 in a releasable manner.

A flexible folding top 62 overlays the frame and is releasably affixed thereto by snaps or other appropriate means. A transparent rear windwo 64 is provided in the top for rearward vision, and a lower end of the rearward portion of the top is affixed to the vehicle body by snaps or other similar devices. Snaps are provided along the lower edge of the top and the perimeter of the vehicle body and doors to mount, in a detachable manner, suitable side curtains to provide protection for the vehicle occupants in inclimate weather.

To move the top from the deployed position to the folded position, the wing screws 60 are loosened and the corner brackets 48 lifted from the posts 52. The top is then easily hinged upward and rearward with the bows folding to an abutting parallel resting against the vehicle rear deck.

The hinges 16 ajoining the rear bow 12 to the frame are made readily separable by the knob 15 so that the entire top may be removed from the vehicle easily by first folding the top and disconnecting the hinges 16.

Having thus described my invention what I claim is:

1. In a folding vehicular top assembly for deployment over a passenger compartment and wherein a flexible cover is supported on a frame comprising:

three pivotally interconnected bows, each having a cover-contacting curved joining portion integral with a pair of parallel legs having free ends, said bows including:

a back bow having its free ends secured to the vehicle and projecting upwardly therefrom;

a center bow having its free ends pivoted to the back bow and projecting upwardly and forwardly therefrom;

a front bow having its legs substantially horizontal and broken into two substantially equal lengths hinged together at a pivot;

said center bow having a pivot located on each leg thereof above the front bow legs;

a pair of opposed short rearwardly extending legs each pivoted at its forward end to said center bow pivot and at its rear end to the adjacent rear one of the front bow legs;

a second pair of opposed short forwardly extending legs, each pivoted at its rearward end to said center bow pivot and at its forward end to the adjacent forward one of said front bow legs;

and means pivotally interconnecting the rear extremities of each of said front bow rear legs to the back bow above the pivot connection of the center bow to said back bow; and means for releasably securing the front bow to the vehicular body.

2. A folding vehicular top assembly comprising:

a flexible cover supported, when deployed, by a rear bow, a center bow and a front bow, each such bow having a cover-contacting bight portion and a pair of parallel leg portions;

the rear bow leg portions each being pivoted at their lower ends to the vehicle to project upwardly therefrom;

the center bow leg portions each being pivotally attached to the adjacent rear bow leg portions above the rear bow-vehicle pivot connection to project upwardly and forwardly therefrom;

the front bow having its legs defined by pivotally interconnected leg sections which are longitudinally aligned in a horizontal plane, the rear sections of the front bow legs each being pivotally connected to the rear bow above the connection of the rear bow to the center bow;

a pivot connection located on each of said center bow leg portions above the plane of the leg sections of the front bow, and a pair of downwardly divergent links pivoted at each of said center bow pivot connections, one such link of each pair being connected to the adjacent rear section of the front bow legs and the other of each pair of such links being connected to the adjacent front section of the front bow leg; and means for releasably securing the front bow to the vehicle.

3. A frame for a folding vehicular top comprising, when the top is deployed over a passenger compartment,
- a rear bow having its parallel legs each pivoted at its lower end to the vehicle body, so that the rear bow projects upwardly and rearwardly therefrom to a top-supporting position;
- a center bow having its parallel legs each pivoted at the lower end to the adjacent rear bow leg, so that the center bow projects forwardly and upwardly therefrom to a top-supporting position;
- a front bow assembly lying horizontally in a top-supporting position, and including a forward bow having its parallel legs horizontal and terminating in free ends located forwardly of said center bow, and horizontal front bow extensions pivotally interconnecting the free ends of said forward bow legs to the rear bow at locations above the pivotal interconnection of the rear bow to the center bow, and
- a scissors assembly including a pivot connection on each of said center bow legs above the plane of the front bow, first scissor links interconnecting the front bow legs to said pivot connections, and second scissors links interconnecting the rear bow legs to said pivot connections, and
- means for releasably securing said front bow to the vehicular body.

* * * * *